United States Patent
Meron

(10) Patent No.: US 10,706,050 B2
(45) Date of Patent: Jul. 7, 2020

(54) DISTRIBUTED JOINING OF DATABASE TABLES THAT ARE KEYED BY VALUE RANGES

(71) Applicant: PAYPAL, INC., San Jose, CA (US)

(72) Inventor: Avishay Meron, Gush-Dan (IL)

(73) Assignee: PAYPAL, INC., San Jose, CA (US)

(*) Notice: Subject to any disclaimer, the term of this patent is extended or adjusted under 35 U.S.C. 154(b) by 259 days.

(21) Appl. No.: 15/859,057

(22) Filed: Dec. 29, 2017

(65) Prior Publication Data
US 2019/0205447 A1 Jul. 4, 2019

(51) Int. Cl.
G06F 17/00 (2019.01)
G06F 16/2453 (2019.01)
G06F 16/22 (2019.01)

(52) U.S. Cl.
CPC .... G06F 16/24544 (2019.01); G06F 16/2282 (2019.01); G06F 16/24537 (2019.01)

(58) Field of Classification Search
CPC ......... G06F 16/24544; G06F 16/24537; G06F 12/2282; G06F 12/1036
USPC .................................................. 707/600–899
See application file for complete search history.

(56) References Cited

U.S. PATENT DOCUMENTS

2005/0005004 A1* 1/2005 Sugauchi ............ H04L 41/0803
709/223

* cited by examiner

Primary Examiner — Isaac M Woo
(74) Attorney, Agent, or Firm — Haynes and Boone, LLP

(57) ABSTRACT

A method is provided that includes assigning one or more first records of a first table and one or more second records of a second table to corresponding range groups of a plurality of range groups. The method further includes comparing at least one record of the first table with at least one record of the second table, where the at least one record of the first table and the at least one record of the second table are assigned to a first range group of the plurality of range groups. The method also includes, based on the comparing, identifying a parent record and a child record and segmenting the parent record based on the child record. Further, the method includes subsequent to the segmenting the parent record, performing a join operation on the first table and the second table.

20 Claims, 8 Drawing Sheets

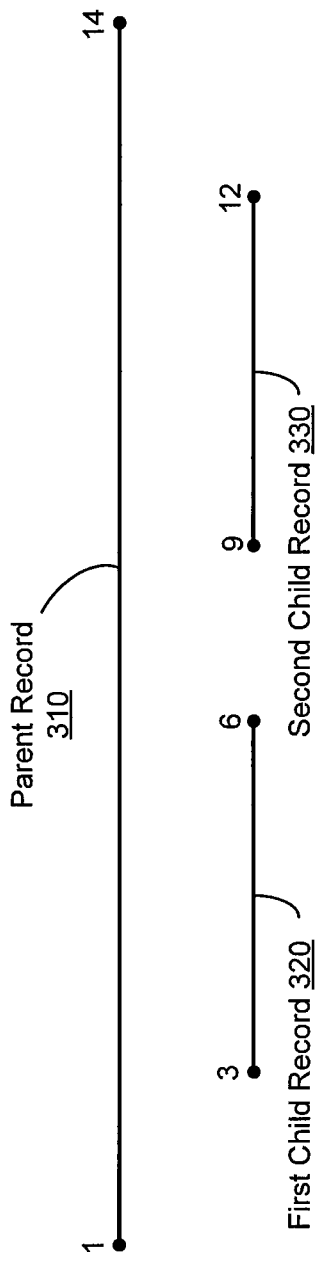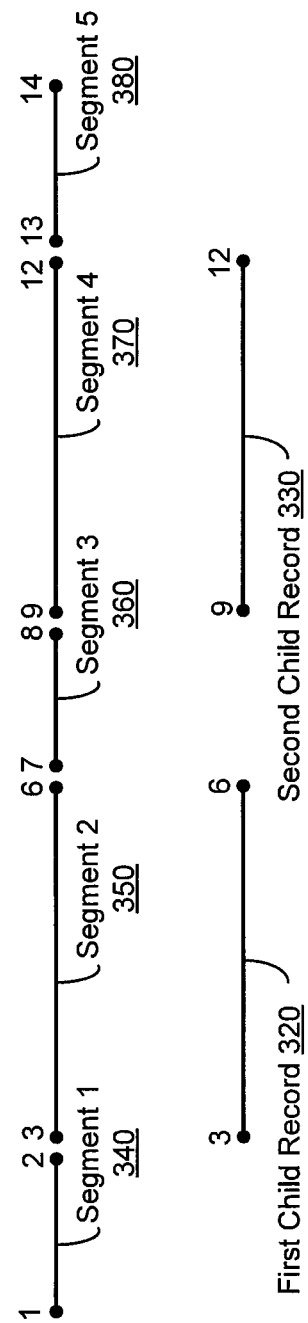
FIG. 3A
FIG. 3B

DISTRIBUTED JOINING OF DATABASE TABLES THAT ARE KEYED BY VALUE RANGES

BACKGROUND

Databases are ubiquitous in today's electronic and digital landscape. Further, databases can include multiple tables that include various information. In some instance, two tables whose records are keyed by similar value types and that include different fields may be joined into one table. However, joining tables that are keyed by value ranges can be computationally expensive.

BRIEF DESCRIPTION OF THE DRAWINGS

FIG. 3A is an example diagram of a parent record and two child records, according to an embodiment;

FIG. 3B is an example diagram of a segmentation of the parent record based on the two child records of FIG. 3A, according to an embodiment;

Figure 1:
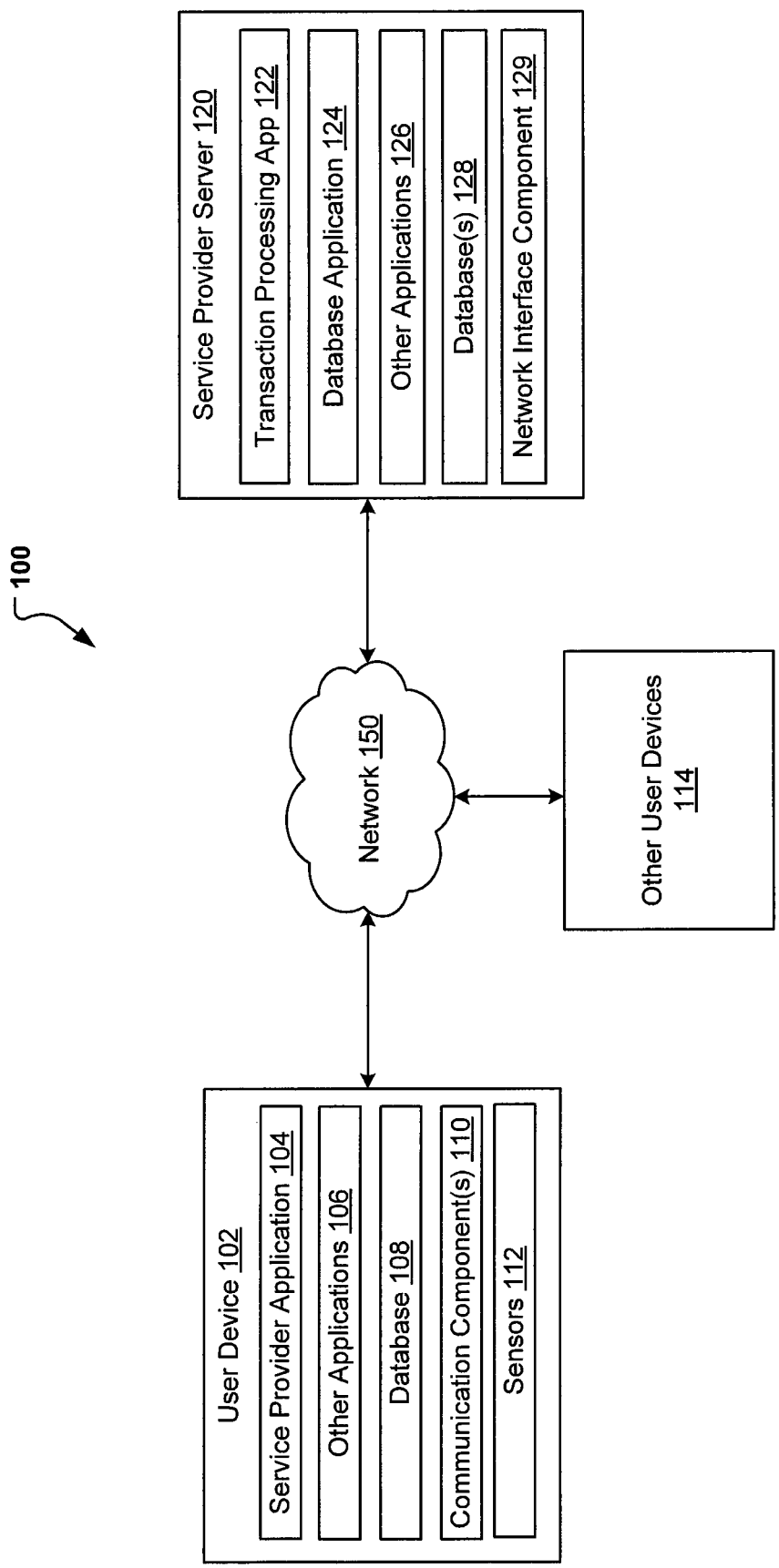
FIG. 1 is a block diagram of a networked system suitable for implementing the processes described herein for distributed joining of database tables that are keyed by value ranges.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Systems and methods are provided for distributed joining of database tables that are keyed by value ranges. It will be appreciated that while the following discussion may describe database tables in terms of being keyed by ranges of network addresses, ranges of other values may also be used to key such database tables and are also contemplated within the present disclosure.

According to a particular embodiment, a service provider server of a service provider may store a first database table and a second database table. The first database table may be keyed by a first set of network address ranges. As such, each record stored in the first database table may be keyed by a network address range from the first set of network address ranges. Further, each network address range of the first database table may include a starting range value and an ending range value. Similarly, a second database table may be keyed by a second set of network address ranges. Additionally, each record stored in the second database table may be keyed by a network address range from the second set of network address ranges. Each network address range of the second database table may also include a starting range value and an ending range value.

For example, Table 1 shows an example of a database table that is keyed by network address ranges. As shown in Table 1, the first record is keyed

TABLE 1

| Starting Range Value | Ending Range Value | Vendor | Device |
|---|---|---|---|
| 0 | 2 | Samsung | Galaxy |
| 3 | 5 | Apple | Iphone 8 | by a network address range with a starting range value of 0 and an ending range value of 2. The second record in Table 1 is keyed by a starting range value of 3 and an ending range value of 5. It will be appreciated that the values and fields depicted in Table 1 are merely examples and that other values and fields are also possible.

In addition, the service provider server may be configured to join the first databases table with the second database table into a joined database table that include fields (columns) from both tables. Further, each record in the joined database table is keyed by network address ranges. For example, Table 1 may be joined with Table 2, resulting in Table 3 (Table 2 and Table 3 provided below). Joining database tables that are keyed by value ranges may present a challenge since the respective keys of both tables may not match. One approach for joining the first database table and the second database table could be simply comparing every record from the first database table to every record in the second database table. However, such an approach may be computationally inefficient and intensive.

TABLE 2

| Starting Range Value | Ending Range Value | Manufacture date | retailer |
|---|---|---|---|
| 2 | 4 | Jan. 1, 2017 | Walmart |
| 5 | 6 | Oct. 10, 2016 | Costco |

TABLE 3

| Starting Range Value | Ending Range Value | Vendor | Device | Manufacture date | retailer |
|---|---|---|---|---|---|
| 0 | 1 | Samsung | Galaxy | Null | Null |
| 2 | 2 | Samsung | Galaxy | Jan. 1, 2017 | Walmart |
| 3 | 4 | Apple | Iphone 8 | Jan. 1, 2017 | Walmart |
| 5 | 5 | Apple | Iphone 8 | Oct. 10, 2016 | Costco |
| 6 | 6 | Null | Null | Oct. 10, 2016 | Costco |

The service provider server may perform a join operation between two tables that may reduce the amount of computing resources used to perform the join operation. According to a particular embodiment, the service provider server may assign each record of the first database table and each record of the second database table to a corresponding range group of a plurality of range groups. For example, the first set of network address ranges and the second set of network address ranges may belong to an overall network address space that is finite. The network address space may be evenly divided into the plurality of range groups. Thus, each range group may represent a different network address range and each network address range of each range group may be the same size (e.g., include the same number of network addresses). As such, the service provider may assign each record (of the first database table and the second database table) to a corresponding range group based on the network address range that keys the record.

In certain cases, a record of the first database table or the second database table may have a corresponding network address range that overlaps network address ranges of multiple range groups. In such cases, the service provider server may segment the record into a number of record segments that is equal to the number of range groups in the multiple range groups that is overlapped by the record. Further, each record segment of the segmented record may be keyed by a network address range that is contained within a network address range of a corresponding range group that was initially overlapped by the record. Accordingly, each record segment may be assigned to the appropriate group based on its network address range.

For example, consider a record that is keyed by a network address range of [5-20], and three groups having network address ranges of [1-8] for group 1, [9-16] for group 2, and [17-24] for group 3. In this example, the record may be segmented into three record segments: a first record segment that is keyed by the range [5-8] and that is assigned to group 1, a second record segment that is keyed by the range [9-16] and that is assigned to group 2, and a third record segment that is keyed by the range [17-20] and that is assigned to group 3.

After assigning each record of the first database table and the second database table to the appropriate range group, the service provider server may execute an overlap segmentation process to segment records that overlap with each other. In particular, for each range group, the service provider server may determine whether records from both the first database table and the second database table have been assigned to the range group. If not, the service provider server may analyze the next range group and make the same determination. However, if records from both the first database table and the second database table have been assigned to the range group, the service provider server may execute the overlap segmentation process with respect to range group.

According to a particular embodiment, the overlap segmentation process may include a full overlap segmentation process and a partial overlap segmentation process. As such, in executing the overlap segmentations process with respect to the range group, the service provider server may first execute the full overlap segmentation process. To this end, the service provider server may compare, within the range group, the records from the first database table with the records from the second database table to identify any parent records and child records. A parent record may be a record that is keyed by a network address range that completely overlaps a network address range that keys a child record. For example, consider a first record keyed by the range [1-10] and a second record keyed by the range [3-6]. In this example, the first record is a parent record to the second record, and the second record is a child record to the first record. It will be appreciated that a parent record can have multiple corresponding child records but a child record can have only one parent record.

Executing the full overlap segmentation process may further include segmenting each parent record according to its child records. In particular, each parent record is segmented according to the network address ranges that key its child records. For example, consider a parent record keyed by the network address range [1-12] and two child records including a first child record keyed by the network address range [2-4] and a second child record keyed by the network address range [6-8]. Executing the full segmentation process may result in the parent record being segmented into five records, keyed by network address ranges of [1-1], [2-4], [5-5], [6-8], and [9-12], respectively.

Subsequent to executing the full overlap segmentation process with respect to the range group, the service provider server may be configured to execute the partial overlap segmentation process with respect to the range group. The partial overlap segmentation process may identify records from the first database table that partially overlap with records from the second database table. That is, records from the first database table keyed by network address ranges that partially overlap network address ranges that key records from the second database table may be identified. For example, a first record from the first database table may be keyed by the network address range [1-5], and a second record from the second database table may be keyed by the network address range [2-6]. Executing the partial overlap segmentation process may result in record segments keyed by network address ranges of [1-1] and [2-5] from the first record and record segments keyed by network address ranges of [2-5] and [6-6] from the second database table.

Subsequent to executing the overlap segmentation process with respect to the appropriate range groups, a join operation may be performed between records of the first database table and records of the second database table.

It will be appreciated that by assigning the records to corresponding groups, the service provider server may avoid searching for parent-child records for groups that do not have records from both the first database table and the second database table assigned to it. As a result, computing resources may be conserved. Further, the assignment of the records to the corresponding groups and the segmentation of records within each group that are keyed by overlapping network address ranges provides a dataset conducive to distributed computing. This also enables the workload for executing a join operation on tables that are keyed by value ranges to be more efficiently handled and distributed, thereby reducing computing cycles and resources.

FIG. 1 is a block diagram of a networked system 100 for implementing the processes described herein, according to an embodiment. As shown, system 100 may include or implement a plurality of devices, computers, servers, and/or software components that operate to perform various methodologies in accordance with the described embodiments. Example devices, computers, and servers may include mobile devices, wearable devices, stand-alone devices, desktop computers, laptop computers, and enterprise-class servers, executing an operating system (OS) such as a MICROSOFT® OS, a UNIX® OS, a LINUX® OS, or another suitable device and/or server based OS. It will be appreciated that the devices, computers, and/or servers illustrated in FIG. 1 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 100 includes a user device 102 configured to communicate with a service provider server 120 over a network 150. The user device 102 and the service provider server 120 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 100, and/or accessible over network 150.

The user device 102 may be implemented as a communication device that may utilize appropriate hardware and software configured for wired and/or wireless communication with the service provider server 120. In certain implementations, the user device 102 may be a mobile phone, tablet, electronic wearable, laptop computer, desktop computer, and/or any other type of computing device usable by a user. The user device 102 may be configured to accept various forms of payment (such as via the service provider application 104), including, but not limited to credit card payments, debit card payments, loyalty card payments, gift card payments, store card payments, and/or payment made by accessing a digital wallet.

The user device 102 may include a service provider application 104, other applications 106, a database 108, communication components 110, and sensors 112. The service provider application 104 and other applications 106 may correspond to executable processes, procedures, and/or applications with associated hardware. In other embodiments, user device 102 may include additional or different components having specialized hardware and/or software to perform operations associated with the service provider application 104 and/or the other applications 106.

The service provider application 104 may be provided and maintained by a service provider associated with the service provider server 120. The service provider application 104 may provide an interface for a user of the user device 102 to initiate or communicate various types of transactions information with respect to services offered and/or facilitated by the service provider. In certain embodiments, the service provider application 104 may provide an interface for the user to effect digital payments using an account that the user maintains with the service provider. As such, the user may initiate one or more purchase requests via the service provider application 104, and the service provider application 104 may communicate with the service provider server 120 to process the purchase requests. According to certain embodiments, transaction information communicated by the service provider application 104 may include various device information corresponding to the user device 102 and/or the environment of the user device 102, such as network addresses, location information, manufacturer information, manufacture date, International Mobile Equipment Identity, phone number, and/or the like. The network address may be an Internet Protocol (IP) address, Media Access Control (MAC) address and/or corresponding to any other type of network addressing protocol. The location information may include GPS coordinates, other type of coordinates, landmark information, and/or any other type of data used to determine location. Such transaction information may be stored by the service provider server 120.

The user device 102 may execute the other applications 106 to perform various other tasks and/or operations corresponding to the user device 102. For example, the other applications 106 may include security applications for implementing client-side security features, programmatic client applications for interfacing with appropriate application programming interfaces (APIs) over network 150, or other types of applications. The other applications 106 may also include additional communication applications, such as email, texting, voice, and instant messaging (IM) applications that enable a user to send and receive emails, calls, texts, and other notifications through the network 150. In various embodiments, the other applications 106 may include location detection applications, such as a mapping, compass, and/or global positioning system (GPS) applications, which may be used to determine a location of the user device 102. The other applications 106 may include social networking applications. Additionally, the other applications 106 may include device interfaces and other display modules that may receive input and/or output information. For example, the other applications 106 may include a graphical (GUI) configured to provide an interface to the user.

In some embodiments, the other applications 106 may include a social media application that enables the user to interface with a social media platform provided by a third-party service provider. Further, the service provider may be integrated with the social media platform (and/or otherwise be in communication with the social media platform). For example, the service provider server 120 may be in communication with one or more servers or devices of the social media platform.

The user device 102 may further include a database 108, which may be stored in a memory and/or other storage device of the user device 102. The database 108 may include, for example, identifiers (IDs) such as operating system registry entries, cookies associated with the digital wallet application 104 and/or other applications 106, IDs associated with hardware of the communication component 110, IDs used for payment/user/device authentication or identification, and/or other appropriate IDs. The database 108 may also include information corresponding to one or purchase transactions of the user who has purchased goods or services from one or more merchants, browsing histories of the user, or other types of user information. In certain embodiments, the user device 102 may also include information corresponding to payment tokens, such as payment tokens generated by the service provider server 120. Further, the database 108 may store login credentials (e.g., such as to login to an account with the service provider and/or other accounts with other service providers), identification information, biometric information, and/or authentication information of the user.

The user device 102 may also include at least one communication component 110 configured to communicate with various other devices such as the other user devices 114 and/or the service provider server 120. In various embodiments, communication component 110 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

The user device 102 may also include one or more hardware sensors 112 to determine user inputs from the user, motion of the user device 102, biometric information associated with the user, and/or various environmental data associated with the user device 102. The sensors 112 may include, but are not limited to, gyroscopes, cameras, microphones, accelerometers, barometers, thermometers, compasses, magnetometers, light detectors, proximity sensors, fingerprint sensors, pedometers, and heart rate monitors.

The other user devices 114 may be implemented as a communication devices that utilize appropriate hardware and software configured for wired and/or wireless communication with the user device 102 and/or the service provider server 120. In certain implementations, the other devices 114 may be mobile phones, tablets, electronic wearables, laptop computers, desktop computers, and/or any other type of computing devices. The other user devices 114 may also be configured to accept various forms of payment including, but not limited to credit card payments, debit card payments, loyalty card payments, gift card payments, store card payments, and/or payment made by accessing a digital wallet.

According to certain embodiments, the other user devices 114 may operate similarly to the user device 102. For instance, the other user device 114 may also interface with the service provider server 120 via other instances of the service provider application. As such, the other user device 114 may provide their own transaction information to the service provide server 120.

The service provider server 120 may be maintained, for example, by the service provider, which may provide payment processing services for the merchant and/or users of the payment application 106. In one example, the service provider server 120 may be provided by PAYPAL, Inc. of San Jose, Calif. USA. However, in other embodiments, the service provider server 120 may be maintained by or include a financial service provider, social networking service, email or messaging service, media sharing service, and/or other service provider, which may provide payment processing services.

The service provider server 120 includes a transaction processing application 122. The transaction processing application 122 may be configured to facilitate digital payments for users of the service provider, such as the users of user device 102 and the other user device 102. According to a particular embodiment, the transaction processing application 122 may receive the purchase requests initiated by the users. Based on the purchase requests, the transaction processing application 122 may store, in a first database (e.g., included in database(s) 128), associations between network addresses, location information, and data connection types corresponding to the payment requests.

The service provider server 120 also includes a database application 124. The database application 124 may configured to join database tables that are keyed by network address ranges (or other value ranges), as described in more detail below with reference to FIG. 2-6.

The service provider server 120 may execute the other applications 126 to perform various other tasks and/or operations corresponding to the service provider server 120. For example, the other applications 126 may include security applications for implementing server-side security features, programmatic client applications for interfacing with appropriate application programming interfaces (APIs) over network 150, or other types of applications. The other applications 126 may also include additional communication applications, such as email, texting, voice, and instant messaging (IM) applications that enable a user to send and receive emails, calls, texts, and other notifications through the network 150. In various embodiments, the other applications 126 may include location detection applications, such as a mapping, compass, and/or global positioning system (GPS) applications. The other applications may 126 include social networking applications. Additionally, the other applications 126 may include device interfaces and other display modules that may receive input and/or output information. For example, the other applications 126 may include a GUI configured to provide an interface to a user.

The service provider server 120 may further include one or more databases 138, which may be stored in a memory and/or other storage device of the service provider server 120. The database(s) 138 may include, for example, IDs such as operating system registry entries, cookies associated with the transaction processing application 122, biometric information, IDs associated with hardware of the network interface component 129, IDs used for payment/user/device authentication or identification, and/or other appropriate IDs.

In various embodiments, the service provider server 120 also includes at least one network interface component 129 that is configured to communicate with the user device 102 and/or the other user devices 114 via the network 150. The network interface component 129 may comprise a DSL modem, an Ethernet device, a broadband device, a satellite device and/or various other types of wired and/or wireless network communication devices including microwave, RF, and IR communication devices.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
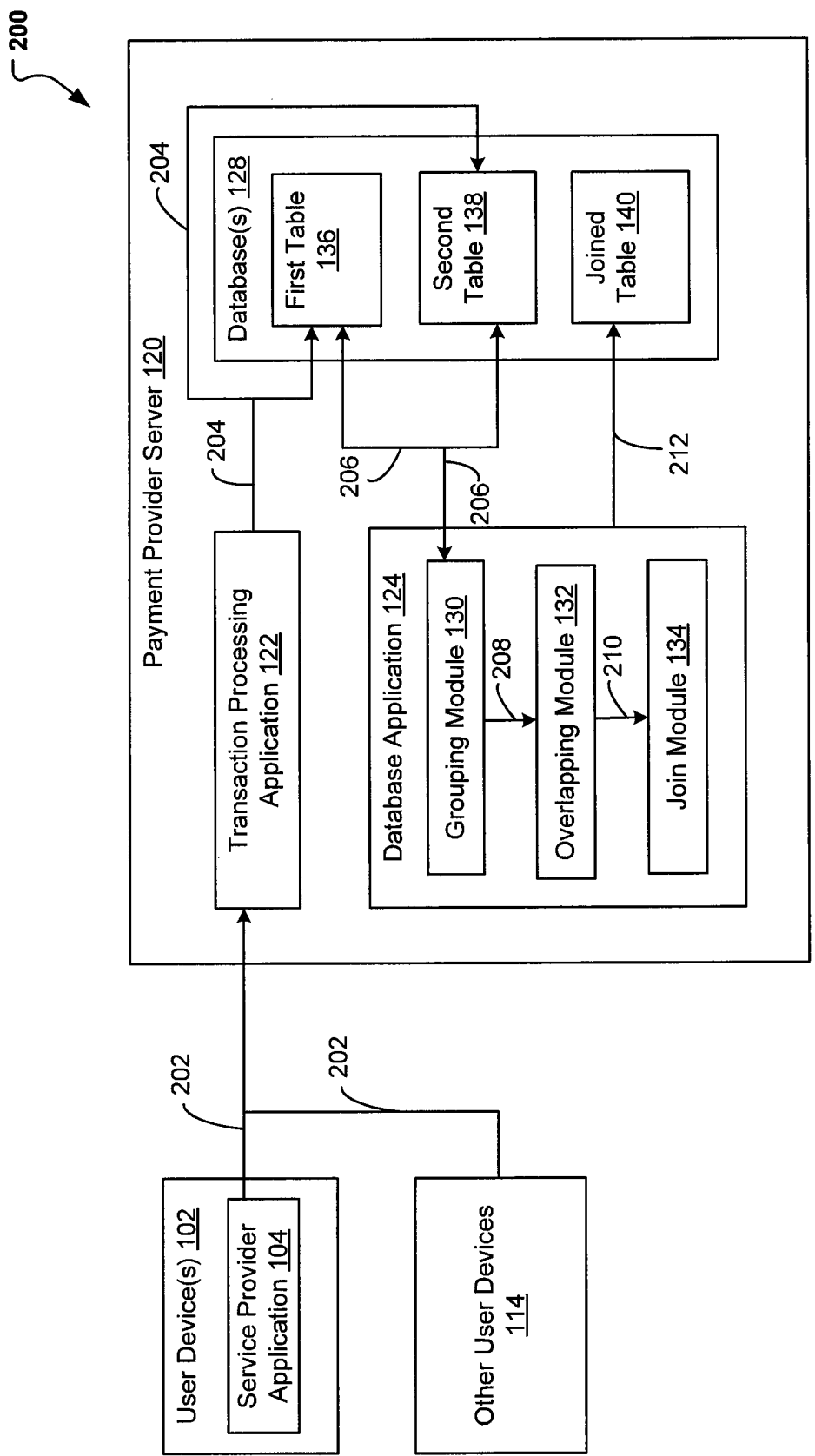
FIG. 2 is an is an example data flow diagram for distributed joining of database tables that are keyed by value ranges, according to an embodiment.

FIG. 2 illustrates a data flow 200 for distributed joining of database tables that are keyed by value ranges. At step 202, the user device 102 and the other user devices 114 may transmit transaction information to the service provider server 120. As previously discussed, the transaction information may include various device information corresponding to the user device 102 and/or user devices 114.

At step 204, the transaction processing application 122 may store, in a first table 136 and/or the second table 138 of the database 128, records corresponding to the transaction information. Records of the first table 136 and records of the second table 138 may store different fields, but records of both tables may be keyed by value ranges belonging to the same value range space. As such, each of the value ranges may include a starting range value and an ending range value. For example, Tables 1-2 illustrate possible formats for the first table 136 and the second table 138. In certain embodiments, the records of the first table 136 and the second table 138 may be keyed by network address ranges belonging to a network address space. For example, the network address ranges may represent MAC address ranges or IP address ranges.

At step 206, the database application 124 may access the first table 136 and the second table 138, such as via a grouping module 130 included in the database application 124. The grouping module may be configured to assign each record of the first table 136 and each record of the second table 138 to a particular range group. For instance, the value range space may be divided evenly into a plurality of range groups, where each group represents a particular value range of the value range space. As such, each value range corresponding to each range group may be of equal size.

In some implementations, a record from the first table 136 or the second table 138 may be keyed by a value range that overlaps the value ranges of multiple groups. In such implementations, the group module 130 may segment the record into a number of record segments that is equal to the number of overlapped groups. Further, there may be a one-to-one relationship between each record segment and each overlapped range group. Thus, each record segment may be keyed by a value range that is wholly contained within a value range of one of the overlapped range groups. To this end, the grouping module 130 may assign each record segment to the group whose value range contains the value range keying the record segment.

For example, consider a record that is keyed by a value range of [7-25], and three groups having network address ranges of [1-10] for group 1, [11-20] for group 2, and [21-30] for group 3. In this example, the record may be segment into three record segments: a first record segment that is keyed by the range [7-10] and that is assigned to group 1, a second record segment that is keyed by the range [11-20] and that is assigned to group 2, and a third record segment that is keyed by the range [21-25] and that is assigned to group 3.

As previously discussed, in certain embodiments, the records of the first table 136 and those of the second table 138 may be keyed by network address ranges that belong to a network address space. In such embodiments, the network address ranges may be represented by one or more octets (e.g., MAC addresses may be represented by 6 octets and IPv4 addresses may be represented by 4 octets). Each octet is a pair of base 16 numbers, and each octet is able to represent 256 values. For instance, an example MAC address may be represented by the six octets 01.4C.BA.23.13.F8.

Moreover, in such embodiments, the records of the first table 136 and the second table 138 may be grouped according to N-octet groupings, where N is the number of most significant octets used to define a group. For example, a 2-octet grouping may group MAC address according to the two most significant octets. For example a MAC address in the format kk.ll.mm.xx.yy.zz may be grouped according to the kk and ll octets.

At step 208, the results of executing the grouping module 130 (e.g., the assignments of the records to the range groups including the potential segmentation of records that overlap multiple groups) may be provided to the overlapping module 132. The overlapping module 132 may be configured to execute an overlap segmentation process with respect to each range group that have records from both the first table 136 and the second table 138 assigned thereto. For instance, the overlapping module 132 may analyze a range group from the plurality of range groups to determine if both at least one record from the first table 136 and at least one record from the second table 138 have been assigned to the range group. If not, the overlapping module 132 may analyze the next range group from the plurality of range groups.

On the other hand, if at least one record from the first table 136 and at least one record from the second table 138 have been assigned to the range group, the overlapping module 132 may execute the overlap segmentation process with respect to the records assigned to the range group. The overlap segmentation process may include a full overlap segmentation process and a partial overlap segmentation process. According to a particular embodiment, the overlap module may first execute the full overlap segmentation process with respect to the records assigned to the range group and then perform the partial overlap segmentation process with respect to the results of executing the full overlap segmentation process.

The full overlap segmentation process may include comparing the records from the first table 136 and second table 138 within the range group to search for any parent records and child records. As used herein, a parent record is keyed by a value range that complete overlaps the value range of a corresponding child record. For example, a first record that is keyed by the value range of [15-25] is a parent record of a second record that is keyed by the value range of [18-22]. Conversely, the second record is a child record of the first record. Further, it will be appreciated that a parent record can have multiple corresponding child records but a child record can have only one corresponding parent record.

Further, in executing the full overlap segmentation process, the overlapping module 132 may segment any identified parent records within the range group according to the respective value range(s) that key its child record(s). For example, FIG. 3A illustrates a parent record 310 and its two corresponding child records, first child record 320 and second child record 330. The parent record 310 may be keyed by a value range of [1-14], the first child record 320 may be keyed by the value range [3-6], and the second child record 330 may be keyed by the value range [9-12].

Further, FIG. 3B illustrates the results of executing the full overlap segmentation process with respect to the parent record 310, the first child record 320, and the second child record 330. As shown in FIG. 3B, parent record 310 is segmented into five record segments (e.g., segment1 340, segment2 350, segment3, 360, segment4 370, and segment5 380. Segment1 may be keyed by the value range [1-2], segment2 may be keyed by the value range [3-6], segment3 may be keyed by the value range [7-8], segment4 may be keyed by the value range [9-12], and segment5 may be keyed by the value range [13-14]. Thus, as depicted in FIG. 3B, the parent record 310 may be segmented in to non-overlapping segments that do not overlap with the first child record 320 or the second child record 330 (e.g., segment1 340, segment3 360, and segment5 380) and overlapping segments that do overlap with the first child record 320 or the second child record (e.g., segment2 350 and segment4 370).

According to certain embodiments, during segmentation of the parent records, the overlapping module 132 may be configured to compare two records at a time. As such, the overlapping module 132 may compare the parent record with each child record separately. For instance, a parent record1 may have two corresponding child records: child record1 and child record 2. The overlapping module 132 may compare parent record1 to child record1 separately from comparing parent record1 to child record2. However, with a parent record have multiple child records, segmenting the parent record based on each child record separately without considering the other child records may produce incorrect segmentation of the parent record. For example, consider a case where parent record1 is keyed by a value range of [1-12], child record1 is keyed by a value range of [2-4], and child record2 is keyed by a value range of [6-8]. Separately segmenting parent record1 based on child record1, and then segmenting parent record1 based on child record2 would product record segments keyed by the value ranges [1-1, 2-4, 5-12] based on child record1 and [1-5, 6-8, 9-12] based on child record 2. However, the correct segmentation of parent record1 would produce record segments keyed by value ranges [1-1, 2-4, 5-5, 6-8, 9-12].

Therefore, in order to properly segment parent records having multiple child records, the overlapping module 132 may be configured to generate tuple information corresponding to parent-child record pairs that have been identified. As such, the overlapping module may store tuple information for each identified parent-child record pair in the following tuple format: (parent_value_range, child_value_range, preceding_end_value, following_start_value).

To this end, parent_value_range represent the value range that keys the parent record; child_value_range represents the value range that keys the child record; preceding_end_value represents the end value of the value range that keys the child record that precedes the child record of the identified parent-child record pair; and following_start_value represents the start value of the value range that keys the child record that follows the child record of the identified parent-child record pair. Both preceding_end_value and following_start_value can have "null" values.

For example, the pair of the parent record 310 and the first child record 320 of FIG. 3A may be expressed as the tuple (1-14, 3-6, null, 9). The pair of the parent record 310 and the second child record 330 may be expressed as the tuple (1-14, 9-12, 6, null). To this end, the overlapping module 132 may generate such tuples for each identified parent-child record pair and store tuple information representing the tuples in the database 128. As such, the overlapping module 132 may analyze each tuple and segment the corresponding parent record of each tuple according to the segmentation logic depicted in Table 4 below.

TABLE 4

| Tuple Values | Segmentation Logic |
| --- | --- |
| Preceding_end_value is null, following_start_value is null | The parent contains a single child. Break the parent according to (p.start, c.start−1) and (c.end+1, p.end). |
| Preceding_end_value is not null, following_start_value is null | The parent contains at least two children: one that present in the tuple and another preceding it. Break the parent according to the (preceding_end_value+1, c.start−1) and (c.end+1, p.end). |
| Preceding_end_value is null, following_start_value is not null | The parent contains at least two children: one that is present in the tuple and another following it. Break the parent according to the (p.start, c.start−1) and (c.end+1, following_end_value−1). |
| Preceding_end_value is not null, following_start_value is not null | The parent contains at least three children: one that is present in the tuple, another following it and another preceding it. Break the parent according to the (preceding_end_value+1, c.start−1) and (c.end+1, following_end_value−1). |

Note that in Table 4, p.start represents the starting value of the value range that keys the parent record in the tuple, and p.end represents the ending value of the value range that keys the parent record in the tuple. Similarly, c.start represents the starting value of the value range that keys the child record in the tuple, and c.end represents the ending value of the value range that keys the child record in the tuple. Further the numerical value of "1" shown in Table 4 corresponds to a single unit of measurement that is being used to describe the value ranges that key the parent record and the child record in the tuple.

Subsequent to executing the full overlap segmentation process, the overlapping module 132 may execute the partial overlap segmentation process with respect to the results of executing the overlap segmentation process on the identified range group. In executing the partial overlap segmentation process, the overlapping module 132 may identify records from the first table 136 that partially overlap with records from the second table 138. That is, records from the first table 136 keyed by value ranges that partially overlap the value ranges that key records from the second table 138 may be identified.

Figure 3C:
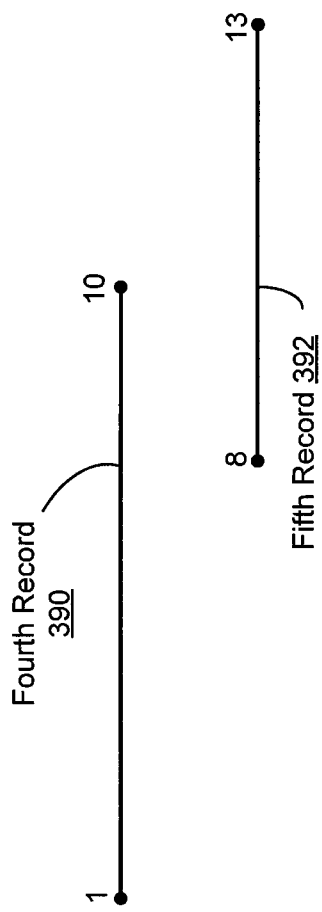
FIG. 3C is an example diagram of two partially overlapping records, according to an embodiment.

For example, as shown in FIG. 3C, a fourth record 390 from the first table 136 may be keyed by the value range [1-10], and a fifth record 392 from the second database table may be keyed by the value range [8-13]. Neither the fourth record 390 nor the fifth record 392 may be entirely contained within the other. Thus, the fourth record 390 and the fifth record 392 partially overlap with each other.

Figure 3D:
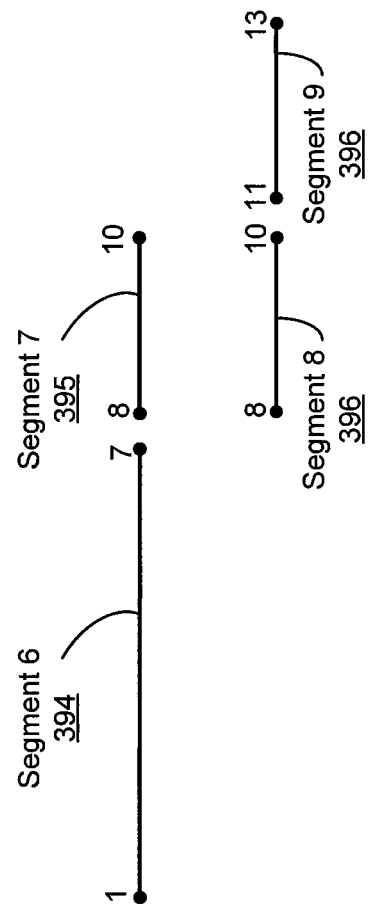
FIG. 3D is an example diagram of the segmentation of the two partially overlapping records in FIG. 3C, according to an embodiment.

Executing the partial overlap segmentation process may result in dividing the fourth record 390 and the fifth record 392 into the segments depicted in FIG. 3D. As shown in FIG. 3D both the fourth record 390 and the fifth record 392 may be segmented according to the overlapping range [8-10]. Thus, the fourth record 390 is segmented into segment6 394 that is keyed by the value range [1-7] and segment7 395 that is keyed by the value range [8-10]. The fifth record 392 is segmented into segment8 396 that is keyed by the value range [8-10] and segment9 396 that is keyed by the value range [11-13].

Upon executing the partial overlap segmentation process with respect to the identified range group, the overlapping module 132 may identify the next range group, if any, of the plurality of range groups to analyze.

At step 210, subsequent to the overlapping module 132 executing the overlap segmentation process with respect to each range group of the plurality of range groups, the join module 134 may for each range group of the plurality of range groups, join the records from the first table 136 and the records from the second table 138. That is, the overlapping module 132 has executed the overlap segmentation process, identified parents records and partially overlapping records from the first table 136 and the second table 138 may now be segmented accordingly. As a result, the overlapping portions of records between the first table 136 and the second table 138 may now be keyed by matching value ranges. To this end, the join module 134 may be configured to execute a join operation on the first table 136 and the second table 138 after any segmentation has been performed.

At step 212, the database application 124 may store the results of the join module 134 joining the records from the first table 136 and the second table 138 as a joined table 140 in the database 128.

Figure 4:
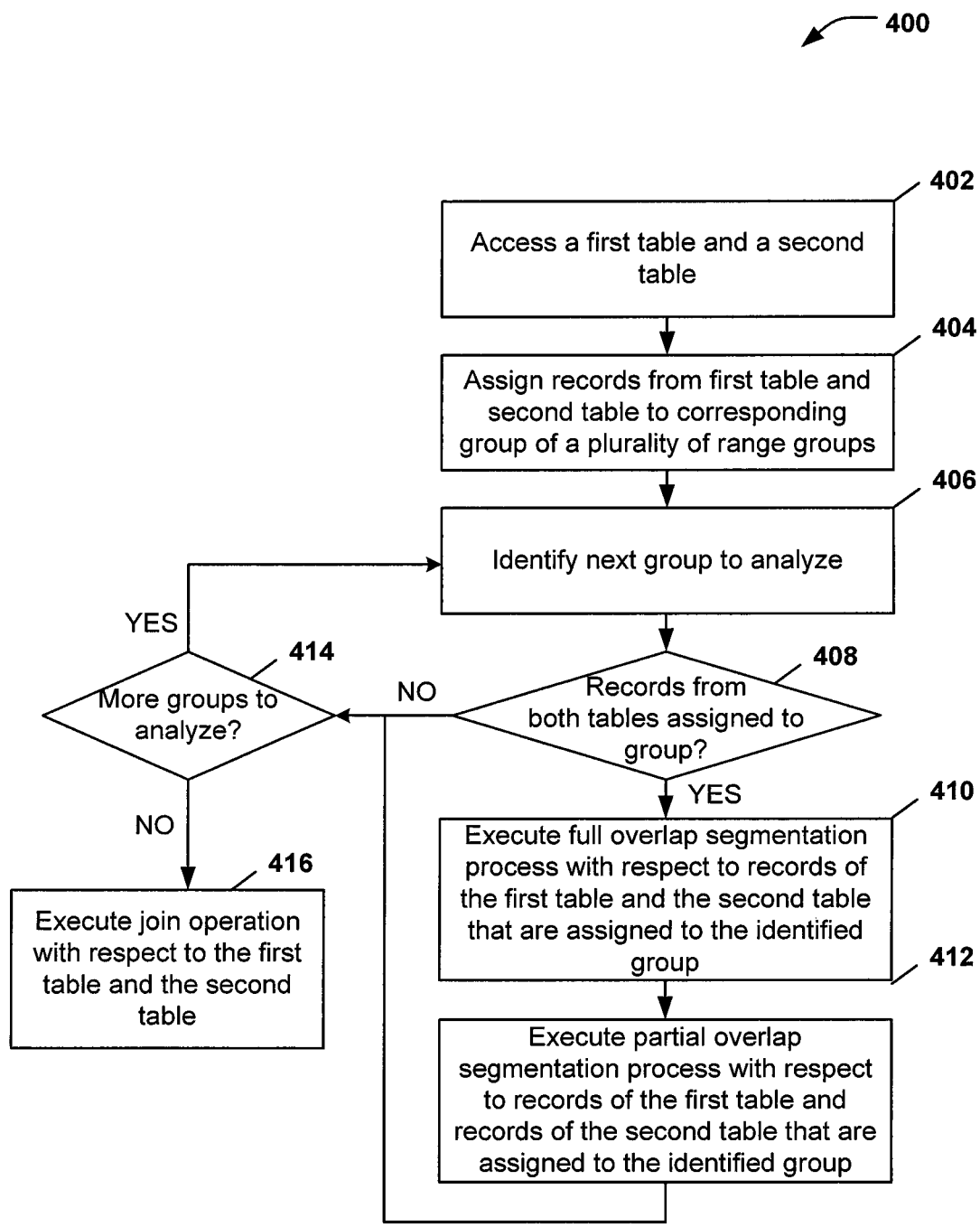
FIG. 4 is an example flow diagram for distributed joining of database tables that are keyed by value ranges, according to another embodiment.

FIG. 4 illustrates a flow diagram of a method 400 for performing a distributed join operation with respect to two database tables. Note that one or more steps, processes, and methods described herein may be omitted, performed in a different sequence, or combined as desired or appropriate.

The method 400 may begin in step 402, where a computer, such as service provider server 120, may access a first database table and a second database table (e.g., first table 136 and second table 138). The records of the first table 136 may be keyed by a first set of value ranges, and the records of the second table 138 may be keyed by a second set of value ranges.

At step 404, the service provider server 120 may assign records from the first table 136 and records from the second table 138 to a corresponding range group of a plurality of range groups. As previously discussed, the plurality of range groups may associated with respective value ranges that evenly divide a value range space.

At step 406, the service provider server 120 may identify the next range group from the plurality of range groups to analyze.

At step 408 the service provider server 120 may determine whether at least one record from both the first table 136 and the second table 138 have been assigned to the identified range group. If not, the method 400 may proceed to step 414. If the service provider server 120 determines that at least one record from both the first table 136 and the second table 138 have been assigned to the identified range group, the method 400 may proceed to step 410.

At step 410, the service provider server 120 may execute a full overlap segmentation process with respect to the records of the first table 136 and second table 138 that have been assigned to the identified range group. At step 412, the service provider server 120 may execute a partial overlap segmentation process with respect to the records of the first table 136 and the second table 138 that have been assigned to the identified range group.

At step 414, the service provider server 1200 may determine whether there are any more range groups to analyze from the plurality of range groups. If so, the method 400 may proceed to step 406, where there service provider server 120 identifies the next range group from the plurality of range groups to analyze. If the service provide server 120 determines that there are no more range groups to analyze, the method 400 may proceed to step 416, where the service provider server 120 may execute a join operation with respect to the first table 136 and the second table 138.

Figure 5:
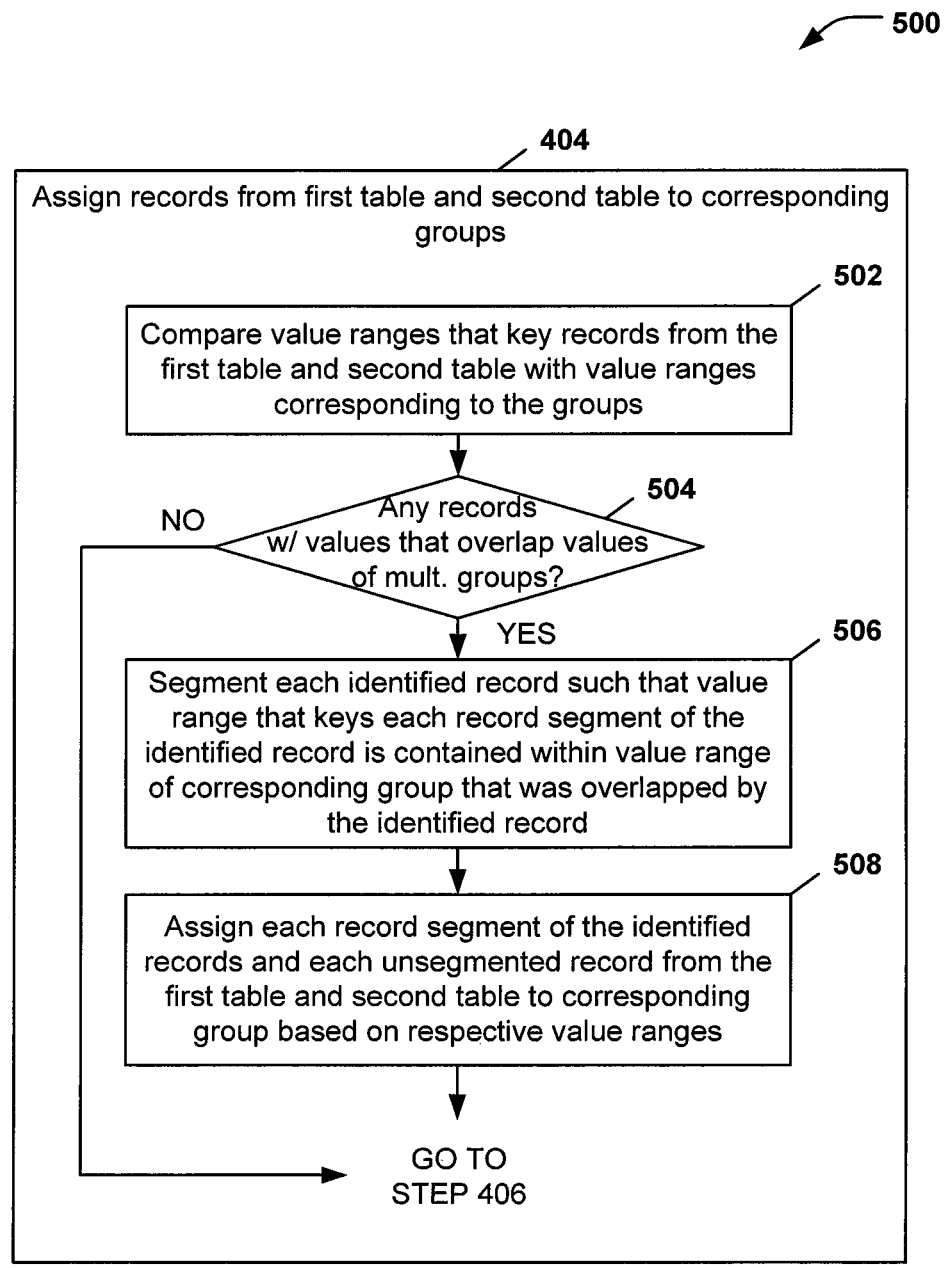
FIG. 5 is an example flow diagram for assigning records to groups, according to an embodiment.

FIG. 5 illustrates a flow diagram of a method 500 for assigning records from a first database table and a second database table to corresponding range groups. As such, the method 500 may describe how to perform step 404 of FIG. 4. Note that one or more steps, processes, and methods described herein may be omitted, performed in a different sequence, or combined as desired or appropriate.

The method 500 may being at step 502, where the service provider server 120 may compare value ranges that key the records of the first table 136 and the second table 138 with value ranges corresponding to each range group from the plurality of range groups.

At step 504, the service provider server 120 may determine whether there are any records from the first table 136 and/or the second table 138 that are keyed by value ranges that overlap the value ranges of more than one range group. If not, the method 500 may proceed to step 406 of FIG. 4. If the service provider server 120 determine that there does exist records that are keyed by value ranges that overlap the value ranges of more than one range group, the method 500 may proceed to step 506.

At step 506, the service provider server 120 may segment each identified record such that the value ranges that key each record segments of the identified record is contained within a value range of a corresponding range group that was overlapped by the identified record.

At step 508, the service provider server 120 may assign each record segment of the identified records that have been segmented and each unsegmented record from the first table 136 and the second table 138 to a corresponding range group based on their respective range values. Subsequent to step 508, the method 500 may proceed to step 406 of FIG. 4.

Figure 6:
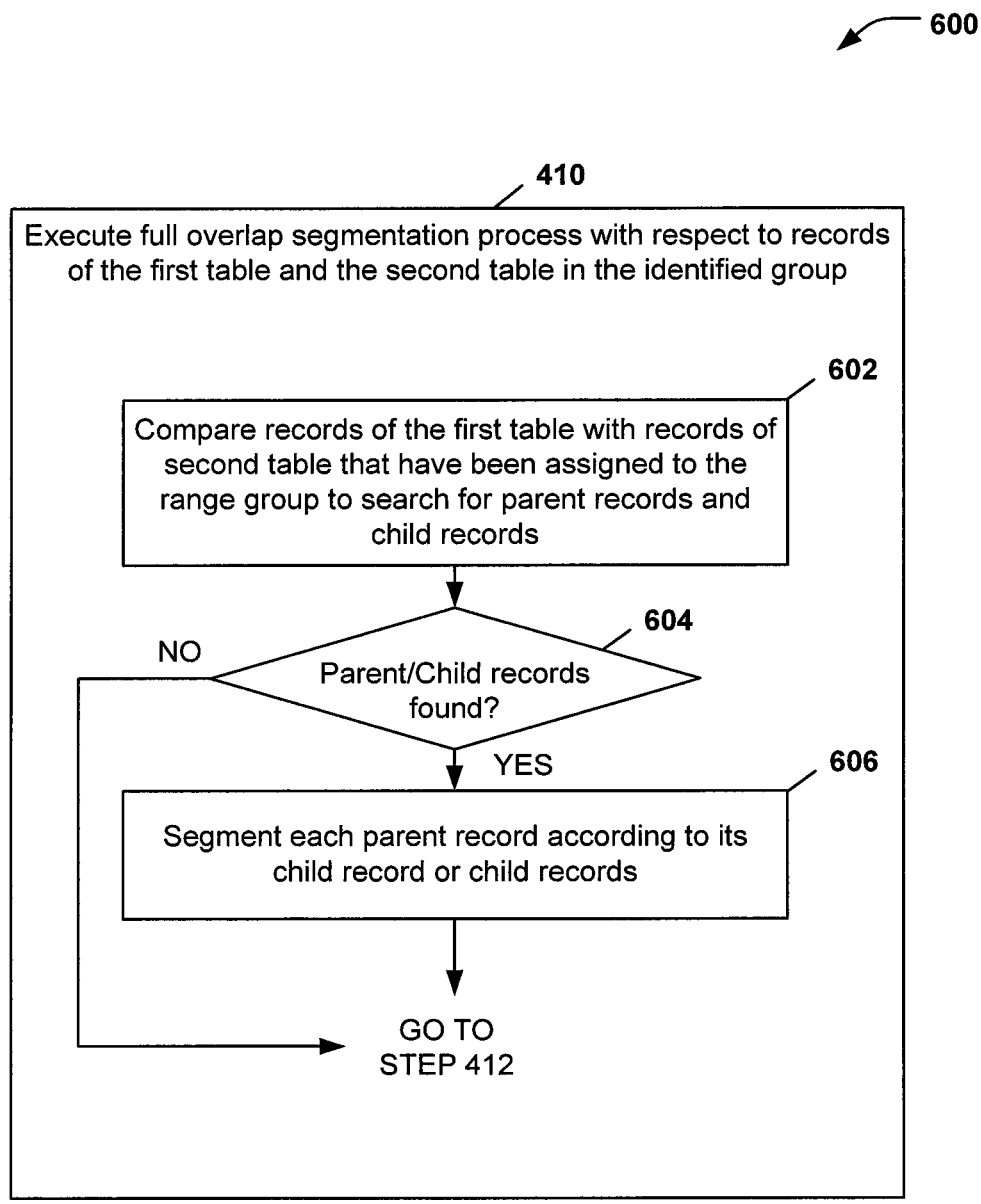
FIG. 6 is an example flow diagram for executing a full overlap segmentation process, according to an embodiment.

FIG. 6 illustrates a flow diagram of a method 600 for executing a full overlap segmentation process in an identified range group. As such, the method 600 may describe how to perform step 410 of FIG. 4. Note that one or more steps, processes, and methods described herein may be omitted, performed in a different sequence, or combined as desired or appropriate.

The method 600 may begin at step 602, where the service provider server 120 may compare records of the first table 136 and records of the second table 138 that are assigned to the identified range group to search for any parent records and child records.

At step 602, the service provider server 120 may determine whether any parent records and child records have been identified for the identified range group. If not, the method 600 may proceed to step 412 of FIG. 4. If the service provider server 120 does identify any parent records and/or child records, the method 600 may proceed to step 606.

At step 606, the service provider server 120 may segment each parent record according to its corresponding child record or child records. Subsequent to step 606, the method 600 may proceed to step 412 of FIG. 4.

Figure 7:
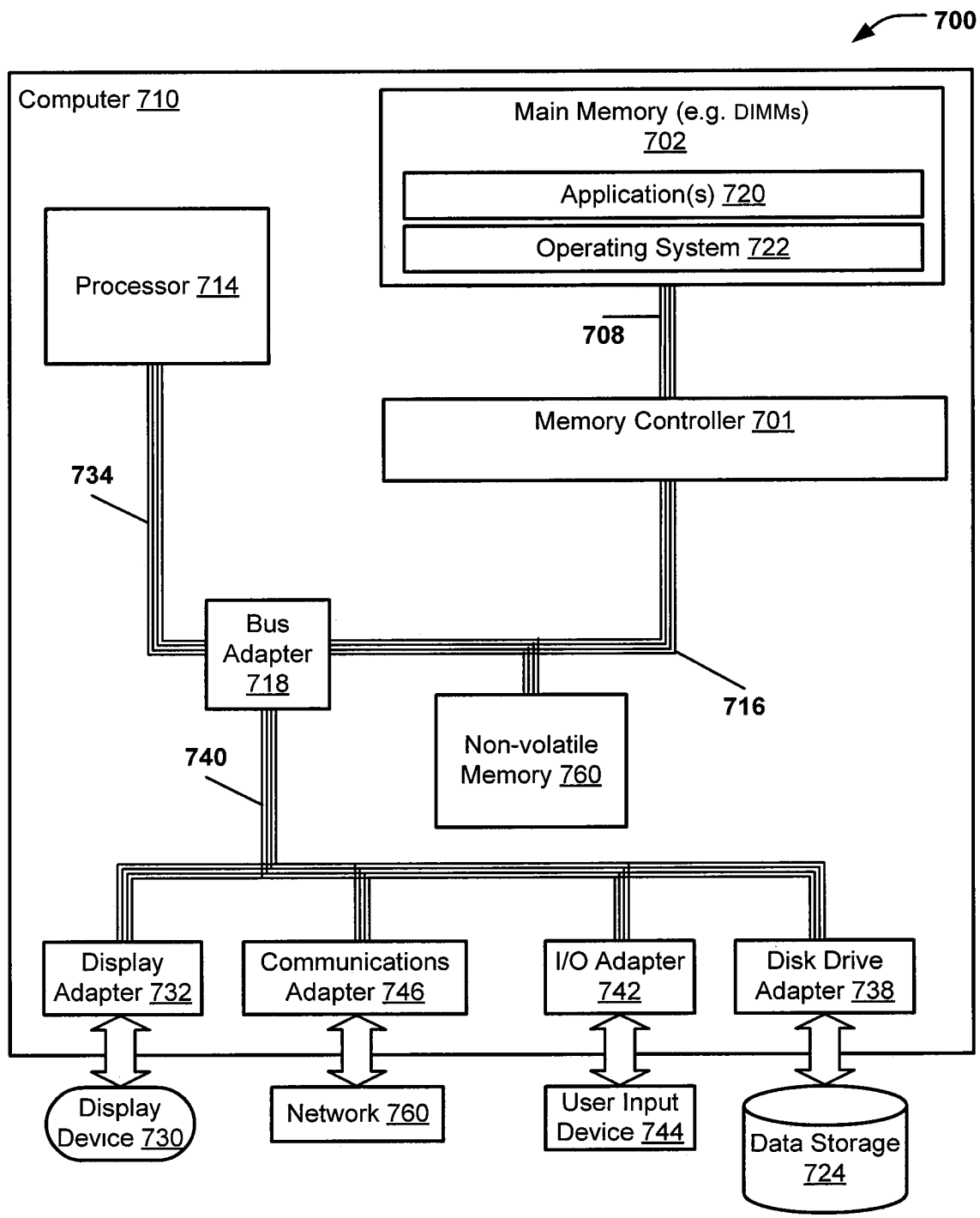
FIG. 7 is a block diagram of a computer system suitable for implementing one or more components in FIG. 1-6, according to an embodiment.

FIG. 7 is a block diagram of a computer system 700 suitable for implementing one or more components in FIG. 1, according to an embodiment. Referring to FIG. 7, an illustrative system 700 including a computer 710 is shown. The computer 710 may be an implementation of a computing system that includes or corresponds to the user device 102, the other user devices 114, and/or the service provider server 120 of FIG. 1. The computer 710 includes at least one computer processor (CPU) 714 (e.g., a hardware processor) as well as main memory 702, a memory controller 701, and a non-volatile memory 760. The main memory 702 is connected through a memory bus 708 to the memory controller 701. The memory controller 701 and the non-volatile memory 760 are connected through a second memory bus 716 and a bus adapter 718 to the processor 714 through a processor bus 734.

Stored at the memory 702 are one or more applications 720 that may be module(s) or computer program instructions for carrying out particular tasks (e.g., the merchant application 103, the service provider application 104, risk analysis application 116, and/or transaction processing application 118 of FIG. 1). Also stored at the main memory 702 is an operating system 722. Operating systems include, but are not limited to, UNIX® (a registered trademark of The Open Group), Linux® (a registered trademark of Linus Torvalds), Windows® (a registered trademark of Microsoft Corporation, Redmond, Wash., United States), and others as will occur to those of skill in the art. The operating system 722 and the application 720 in the example of FIG. 7 are shown in the main memory 702, but components of the aforementioned software may also, or in addition, be stored at non-volatile memory (e.g., on data storage, such as data storage 724 and/or the non-volatile memory 760).

The computer 710 includes a disk drive adapter 738 coupled through an expansion bus 740 and the bus adapter 718 to the processor 714 and other components of the computer 710. The disk drive adapter 738 connects non-volatile data storage to the computer 710 in the form of the data storage 724 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art. In a particular embodiment, the data storage 724 may store the data and information described herein.

The computer 710 also includes one or more input/output ("I/O") adapters 742 that implement user-oriented input/output through, for example, software drivers and computer hardware for controlling input and output to and from user input devices 744, such as keyboards and mice. In addition, the computer 710 includes a communications adapter 746 for data communications with a data communications network 760. The data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 746 implements the hardware level of data communications through which one computer sends data communications to another computer, directly or through a data communications network. Examples of the communications adapter 746 suitable to use in the computer 710 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 710 also includes a display adapter 732 that facilitates data communication between the bus adapter 718 and a display device 730, enabling the application 720 to visually present output on the display device 730.

In various embodiments of the present disclosure, execution of instruction sequences to practice the present disclosure may be performed by computer system 700. In various other embodiments of the present disclosure, a plurality of computer systems 700 coupled by communications adapter 746 to the network (e.g., such as a LAN, WLAN, and/or various other wired or wireless networks, including telecommunications, mobile, and cellular phone networks) may perform instruction sequences to practice the present disclosure in coordination with one another.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium or storage device and executed by a processor that includes but is not limited to firmware, resident software, microcode, etc.

Further, embodiments of the present disclosure, may take the form of a computer program product accessible from a computer-usable or computer-readable storage device providing program code (e.g., computer-executable instructions) for use by or in connection with a computer, processor, or any instruction execution system. For the purposes of this description, a computer-usable or computer-readable storage device may be non-transitory and can be any apparatus that can tangibly embody a computer program and that can contain, store, communicate, propagate, or transport the program for use by or in connection with the instruction execution system, processor, apparatus, or device.

In various embodiments, the medium can include an electronic, magnetic, optical, electromagnetic, infrared, or semiconductor system (or apparatus or device) or a propagation medium. Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A system, comprising:
one or more hardware processors; and
a memory storing computer-executable instructions, that in response to execution by the one or more hardware processors, causes the system to perform operations comprising:
accessing a first database table and a second database table, the first database table being keyed by a first set of network address ranges and the second database table being keyed by a second set of network address ranges;
assigning, based on the first set of network address ranges and the second set of network address ranges, each record of the first database table and each record of the second database table to a corresponding range group of a plurality of range groups;
executing a segmentation process with respect to the first database table and the second database table, the segmentation process comprising:
determining, based on a comparison between the first database table and the second database table, one or more parent records assigned to a first range group of the plurality of range groups and one or more child records assigned to the first range group, wherein the determining the one or more parent records and the one or more child records comprises:
identifying a first parent record from the first database table, the first parent record keyed by a first network address range of the first set of network address ranges; and
identifying at least one child record from the second database table, the at least one child record keyed by a second network address range of the second set of network address ranges, the first network address range completely overlapping the second network address range; and
segmenting the one or more parent records based on one or more child network address ranges that key the one or more child records, the segmenting producing one or more segmented parent records of the first database table; and
subsequent to the executing the segmentation process, joining the first database table with the second database table.

2. The system of claim 1, wherein each range group of the plurality of range groups corresponds to a respective network address range of a network address space, the network address space including the first set of network address ranges and the second set of network address ranges.

3. The system of claim 1, wherein each respective network address range of each range group does not overlap with other respective address ranges of the other range groups.

4. The system of claim 1, wherein each range group of the plurality of range groups are determined based on octet grouping of a network address space.

5. The system of claim 1, each network address range of the first set of network address ranges and each network address range of the second set of network address ranges comprises a starting network address and an ending network address.

6. The system of claim 1, wherein the segmenting the one or more parent records further comprises:
dividing the first parent record into one or more overlapping records and one or more non-overlapping records, each of the one or more overlapping records keyed by a respective network address range that is the same as a corresponding network address range of a corresponding child record of the at least one child record, and each of the one or more non-overlapping records keyed by a respective network address range that does not overlap with any corresponding network address range of the at least one child record; and.

7. The system of claim 1, wherein the assigning each record of the first database table and each record of the second database table to the corresponding range group of the plurality of range groups further comprises:
identifying a first record of the first database table that is keyed by a network address range that overlaps a network address range of the first range group of the plurality of range groups and overlaps a second address range of a second group range of the plurality of range groups;
dividing the first record into a first new record and a second new record, the first new record keyed by a first new network range that is contained within the network address range of the first range group, and the second new record keyed by a second new network range that is contained within the network address range of a second range group of the plurality of range groups; and
assigning the first new record to the first range group and the second new record to the second range group.

8. The system of claim 1, wherein the comparison between the first database table and the second database table comprises a comparison between one or more records from the first databases table that are assigned to the first range group and one or more records from the second database table that are assigned to the first range group.

9. The system of claim 1, wherein the segmentation process further comprises:
subsequent to the segmenting the one or more parent records, determining, based on a second comparison between the first database table and the second database table, a first record from the first database table they is keyed by a first network address range that partially overlaps with a second network address range that keys a second record from the second database table.

10. The system of claim 1, wherein prior to the assigning the each record of the first database table and the each record of the second database table to the corresponding range group, the operations further comprise:
dividing the plurality of range groups into equally sized range groups; and
determining the first set of network address ranges and the second set of network address ranges based on the equally sized range groups.

11. A method, comprising:
assigning, by a computer comprising one or more hardware processors, one or more first records of a first table and one or more second records of a second table to corresponding range groups of a plurality of range groups, the one or more first records being assigned based on respective value ranges that key the one or more first records, and the one or more second records being assigned based on respective value ranges that key the one or more second records;
comparing at least one record of the first table with at least one record of the second table, the at least one record of the first table and the at least one record of the second table being assigned to a first range group of the plurality of range groups;
based on the comparing, identifying a parent record and a child record of the parent record, the parent record being keyed by a first value range, and the child record being keyed by a second value range that is contained within the first value range;
generating tuple information corresponding to the parent record and the child record the tuple information comprising the first value range, the second value range, an ending range value of a value range that keys a preceding child record that precedes the child record, and a starting range value of a value range that key a following child record that follows the child record;
segmenting the parent record based on the second value range and the tuple information; and
subsequent to the segmenting the parent record, performing a join operation on the first table and the second table.

12. The method of claim 11, wherein the segmenting the parent record comprises:
generating a first record segment of the parent record that is keyed by a third value range that matches the second value range; and generating a second record segment of the parent record that is keyed by a fourth value range that does not overlap the second value range.

13. The method of claim 11, wherein the respective value ranges that key the one or more first records correspond to a first set of network address ranges, and the respective value ranges that key the one or more second records correspond to a second set of network address ranges.

14. The method of claim 11, further comprising:
based on the comparing, identifying a second child record of the parent record, the second child record being keyed by a third value range that is contained within the first value range, wherein the segmenting the parent record is further based on the third value range.

15. The method of claim 11, further comprising:
subsequent to the segmenting the parent record, identifying a third record assigned to the first range group and a fourth record assigned to the first range group, the third record being keyed by a third value range that partially overlaps a fourth value range that keys the fourth record.

16. The method of claim 11, wherein prior to the assigning the each record of the first database table and the each record of the second database table to the corresponding range group, the method further comprises:
dividing the plurality of range groups into equally sized range groups; and
determining the first set of network address ranges and the second set of network address ranges based on the equally sized range groups.

17. A non-transitory computer readable medium storing computer-executable instructions that in response to execution by one or more hardware processors, causes a payment provider system to perform operations comprising:
assigning one or more first records of a first table and one or more second records of a second table to corresponding range groups of a plurality of range groups, the one or more first records being assigned based on respective value ranges that key the one or more first records, and the one or more second records being assigned based on respective value ranges that key the one or more second records;
comparing at least one record of the first table with at least one record of the second table, the at least one record of the first table and the at least one record of the second table being assigned to a first range group of the plurality of range groups;
based on the comparing, identifying a parent record and a child record of the parent record, the parent record being keyed by a first value range, and the child record being keyed by a second value range that is contained within the first value range;
segmenting the parent record based on the second value range;
subsequent to the segmenting the parent record, performing a join operation on the first table and the second table; and
subsequent to the segmenting the parent record, identifying a third record assigned to the first range group and a fourth record assigned to the first range group, the third record being keyed by a third value range that partially overlaps a fourth value range that keys the fourth record.

18. The non-transitory computer readable medium of claim 17, wherein the operations further comprise:
generating a first record segment of the parent record that is keyed by a third value range that matches the second value range; and
generating a second record segment of the parent record that is keyed by a fourth value range that does not overlap the second value range.

19. The non-transitory computer readable medium of claim 17, wherein the third record comprises a record segment of the parent record produced as a result of the segmenting the parent record.

20. The non-transitory computer readable medium of claim 17, wherein prior to the assigning the each record of the first database table and the each record of the second database table to the corresponding range group, the operations further comprise:
dividing the plurality of range groups into equally sized range groups; and
determining the first set of network address ranges and the second set of network address ranges based on the equally sized range groups.

* * * * *